United States Patent
Kim

(10) Patent No.: US 11,563,481 B2
(45) Date of Patent: Jan. 24, 2023

(54) METHOD AND APPARATUS FOR RELAY BASED ON MULTIPLE BEAMS IN VEHICLE-TO-EVERYTHING COMMUNICATION SYSTEM

(71) Applicant: ELECTRONICS AND TELECOMMUNICATIONS RESEARCH INSTITUTE, Daejeon (KR)

(72) Inventor: Seon Ae Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 168 days.

(21) Appl. No.: 17/094,025

(22) Filed: Nov. 10, 2020

(65) Prior Publication Data

US 2021/0143895 A1    May 13, 2021

(30) Foreign Application Priority Data

Nov. 13, 2019  (KR) .................. 10-2019-0145435
Nov. 9, 2020   (KR) .................. 10-2020-0148883

(51) Int. Cl.
| | | |
|---|---|---|
| H04B 7/155 | (2006.01) | |
| H04W 4/40 | (2018.01) | |
| H04B 17/345 | (2015.01) | |
| H04L 5/14 | (2006.01) | |
| H04W 88/04 | (2009.01) | |

(52) U.S. Cl.
CPC ....... *H04B 7/15528* (2013.01); *H04B 17/345* (2015.01); *H04L 5/143* (2013.01); *H04W 4/40* (2018.02); *H04W 88/04* (2013.01)

(58) Field of Classification Search
None
See application file for complete search history.

(56) References Cited

U.S. PATENT DOCUMENTS

| | | | |
|---|---|---|---|
| 9,450,694 B1 | 9/2016 | Jung et al. | |
| 10,637,634 B2 | 4/2020 | Son et al. | |
| 2003/0107435 A1* | 6/2003 | Gu ................. | H03F 1/0294 330/149 |
| 2004/0176039 A1* | 9/2004 | Leyh ............... | H04W 48/16 455/67.11 |

(Continued)

FOREIGN PATENT DOCUMENTS

| | | | |
|---|---|---|---|
| KR | 10-1771436 B1 | 8/2017 | |
| KR | 10-2019-0081421 A | 7/2019 | |
| WO | WO-9610871 * | 4/1996 | ............. H04B 1/005 |

*Primary Examiner* — Alpus Hsu
*Assistant Examiner* — Camquyen Thai
(74) *Attorney, Agent, or Firm* — LRK Patent Law Firm

(57) ABSTRACT

An operation method of a relay operating in an in-band full duplex (IFD) scheme includes measuring a signal received from a source node during a first period; measuring a signal received from the source node and a signal received after being transmitted from the relay through a first beam during a second period, the second period being a period after a predetermined delay time from the first period; and calculating a self-interference (SI) amount of the first beam by comparing a measurement result during the second period with a measurement result during the first period.

12 Claims, 5 Drawing Sheets

(56) References Cited

U.S. PATENT DOCUMENTS

| | | | |
|---|---|---|---|
| 2007/0110016 A1* | 5/2007 | Shen | H04B 7/15542 370/350 |
| 2010/0216394 A1* | 8/2010 | Shin | H04B 17/40 455/9 |
| 2015/0063176 A1 | 3/2015 | Hong et al. | |
| 2015/0382375 A1 | 12/2015 | Bhushan et al. | |
| 2017/0013628 A1 | 1/2017 | Kim et al. | |
| 2017/0126306 A1 | 5/2017 | Kim et al. | |
| 2017/0302361 A1* | 10/2017 | Lim | H04L 5/14 |
| 2018/0184335 A1 | 6/2018 | Kwon et al. | |
| 2018/0309502 A1* | 10/2018 | Khandani | H04B 7/15535 |
| 2019/0123806 A1* | 4/2019 | Aryafar | H04B 7/15592 |
| 2019/0158263 A1 | 5/2019 | Lee et al. | |
| 2019/0199392 A1 | 6/2019 | Kim et al. | |
| 2019/0312619 A1* | 10/2019 | Abedini | H04B 17/382 |

* cited by examiner

METHOD AND APPARATUS FOR RELAY BASED ON MULTIPLE BEAMS IN VEHICLE-TO-EVERYTHING COMMUNICATION SYSTEM

CROSS-REFERENCE TO RELATED APPLICATIONS

This application claims priority to Korean Patent Applications No. 10-2019-0145435 filed on Nov. 13, 2019 and No. 10-2020-0148883 filed on Nov. 9, 2020 in the Korean Intellectual Property Office (KIPO), the entire contents of which are hereby incorporated by reference.

BACKGROUND

1. Technical Field

The present disclosure relates to a mobile relay in a vehicle wireless communication system, and more particularly, to an operation method of a mobile relay for vehicle-to-everything (V2X) communication, and a mobile relay apparatus for the same.

2. Description of Related Art

Vehicle wireless communication technology, expressed as vehicle-to-everything (V2X), is a communication technology that supports various vehicle-related communication services such as vehicle safety, autonomous driving, in-vehicle entertainment, and platooning. In the $3^{rd}$ generation partnership project (3GPP), a 5G new radio (NR) V2X standardization based on the 5G NR Rel-15 standard is in progress, and a sidelink that is a device-to-device communication scheme that enables vehicle communication outside a network service area to meet the service requirements required by the 5G has been introduced in the NR.

In the 5G mobile communication technology, a millimeter wave frequency band that is easy to secure a wide frequency bandwidth to satisfy requirements of an enhanced mobile broadband (eMBB) service requirements to support a large transmission speed of several Gbps, such as large file transmission and high-definition video services. Unlike the existing sub-6 GHz band called 'sub-6 GHz', the millimeter wave (mmWave) band is a 30~300 GHz frequency band and has a wavelength in millimeters. In the 5G NR, in order to increase a communication channel capacity by using the wide bandwidth of the millimeter wave frequency band that has not yet been allocated, a frequency band of 6 GHz or above is defined as a frequency range (FR) 2, and an 'above-6 GHz' standard has been established. The millimeter wave has a disadvantage of experiencing a higher path loss than a low-frequency band communication of less than 6 GHz due to its short wavelength, but on the contrary, due to an advantage of smaller antenna size, it is possible to integrate a large number of antennas in a small space, thus miniaturizing the hardware. Accordingly, in the millimeter wave communication, a multi-antenna beamforming technique having high directivity is adopted as a technique to overcome the path loss.

In the existing mobile communication system, a relay has mainly considered a time division duplex (TDD) scheme in which a transmission period is separated from a reception period in time to avoid self-interference (SI). The SI refers to interference that occurs when a signal transmitted from an in-band full-duplex (IFD) transceiver is introduced into itself. The existing communication system adopts a half-duplex (HD) scheme that is less efficient in frequency than the IFD scheme, but is easy to control interference. Therefore, the relay based on the TDD scheme cannot transmit and receive signals simultaneously. For example, in case of an LTE-based relay, during a period in which the relay receives a signal from a backhaul link, the relay cannot transmit any signal including a control signal through a communication link between terminals. Therefore, the relay receives a signal from a base station only in a Multimedia Broadcast Single Frequency Network (MBSFN) subframe period in which a transmission gap exists, and transmits a PDCCH to the terminal in a specific OFDM symbol period. Accordingly, in the relay operating in the HD scheme, a time delay from the base station to the final terminal through the relay is very large, and timing alignment for temporally separating the transmission and reception periods to prevent the transmission/reception signals from interfering with each other should be controlled elaborately. In addition, there is a disadvantage that only limited data can be relayed, since it is not possible to allocate many time slots for the relay while separating the transmission and reception durations in time.

SUMMARY

Accordingly, exemplary embodiments of the present disclosure provide an operation method of a multi-beam based relay operating in an in-band full duplex (IFD) scheme. Accordingly, exemplary embodiments of the present disclosure also provide a multi-beam based relay operating in the IFD scheme.

According to exemplary embodiments of the present disclosure, an operation method of a relay operating in an in-band full duplex (IFD) scheme may comprise measuring a signal received from a source node during a first period; measuring a signal received from the source node and a signal received after being transmitted from the relay through a first beam during a second period, the second period being a period after a predetermined delay time from the first period; and calculating a self-interference (SI) amount of the first beam by comparing a measurement result during the second period with a measurement result during the first period.

The predetermined delay time may be a delay time for a relaying operation of the relay.

The predetermined delay time may be a time obtained by summing a delay time for a relaying operation of the relay and an additional intended delay time.

Automatic gain control (AGC) values of the relay in the first period and the second period may be set to equal.

A signal measured in the first period and the second period may be a synchronization signal, a short training format (STF) preamble, or a long training format (LTF) preamble.

The relay, the source node, and a destination node may operate in a beam sweeping scheme.

The operation method may further comprise, when the calculated SI amount of the first beam is smaller than a predetermined or preconfigured threshold, determining to perform a relaying operation for the source node.

When the relay has N transmission beams, if SI amounts of L transmission beams among the N transmission beams are smaller than the threshold and an SI amount of an i-th beam of the L transmission beams is smaller than an SI amount of an (i−1)-th beam of the L transmission beams, the relay may determine to perform the relaying operating for the source node by using the i-th transmission beam, N is a natural number, and L is a natural number equal to or less than N.

When the relay has N transmission beams, the relay may determine to perform the relaying operating for the source node by using a transmission beam having a smallest SI amount among the N transmission beams, N is a natural number, and L is a natural number equal to or less than N.

Furthermore, according to exemplary embodiments of the present disclosure, a relay operating in an in-band full duplex (IFD) scheme may comprise an analog beamforming unit connected to at least one transmission antenna and at least one reception antenna; a radio frequency (RF) conversion unit for converting a baseband signal into an RF band signal or converting an RF band signal into a baseband signal, and controlling a gain of a reception signal; a beam measurement unit measuring a signal received from a source node and a signal received after being transmitted from the relay through a first beam; and a beam management unit that controls operations of the analog beamforming unit, the RF conversion unit, and the beam measurement unit, wherein the beam management unit is configured to: measure a signal received from a source node during a first period; measure a signal received from the source node and a signal received after being transmitted from the relay through a first beam during a second period, the second period being a period after a predetermined delay time from the first period; and calculate a self-interference (SI) amount of the first beam by comparing a measurement result during the second period with a measurement result during the first period.

The predetermined delay time may be a delay time for a relaying operation of the relay.

The predetermined delay time may be a time obtained by summing a delay time for a relaying operation of the relay and an additional intended delay time.

Automatic gain control (AGC) values of the relay in the first period and the second period may be set to equal.

A signal measured in the first period and the second period may be a synchronization signal, a short training format (STF) preamble, or a long training format (LTF) preamble.

The relay, the source node, and a destination node may operate in a beam sweeping scheme.

When the calculated SI amount of the first beam is smaller than a predetermined or preconfigured threshold, the beam management unit may determine to perform a relaying operation for the source node.

When the analog beamforming unit forms N transmission beams, if SI amounts of L transmission beams among the N transmission beams are smaller than the threshold and an SI amount of an i-th beam of the L transmission beams is smaller than an SI amount of an (i−1)-th beam of the L transmission beams, the beam management unit may determine to perform the relaying operating for the source node by using the i-th transmission beam, N is a natural number, and L is a natural number equal to or less than N.

When the analog beamforming unit forms N transmission beams, the beam management unit may determine to perform the relaying operating for the source node by using a transmission beam having a smallest SI amount among the N transmission beams, N is a natural number, and L is a natural number equal to or less than N.

Using the exemplary embodiments of the present disclosure, a signal blocking phenomenon and a shadow area frequently occurring by an obstacle within a network of a vehicle wireless communication system may be eliminated. The relay according to the exemplary embodiment of the present disclosure can relay data with a shorter time delay compared to the conventional TDD-based relay, and expand the amount of data to be relayed or relay time slots by performing simultaneous transmission and reception without separating reception and transmission periods for the relay. In addition, the multi-beam based full-duplex relay transceiver according to the present disclosure has an effect of reducing a burden of an analog/digital SI cancellation (SIC) operation of the conventional full-duplex communication device.

BRIEF DESCRIPTION OF DRAWINGS

Exemplary embodiments of the present disclosure will become more apparent by describing in detail exemplary embodiments of the present disclosure with reference to the accompanying drawings, in which.

DETAILED DESCRIPTION

Figure 1:
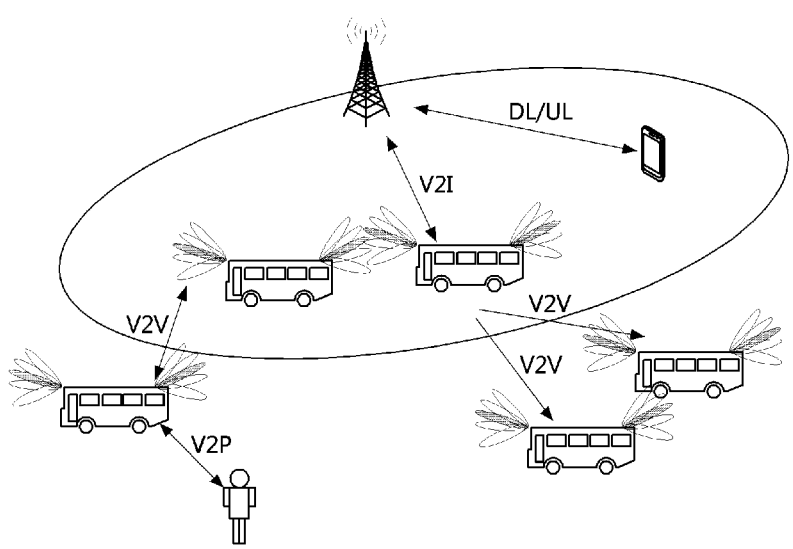
FIG. 1 is a conceptual diagram of a vehicle wireless communication system using a millimeter wave band.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

Exemplary embodiments of the present disclosure relate to a vehicle wireless relay for extending a service area by removing a shadow area formed by a signal blockage by an obstacle in a V2X wireless communication network, and transmitting signals to a vehicle or terminal outside the network. Hereinafter, exemplary embodiments of the present disclosure will be described by taking a relay in V2X communication based on cellular communication as an example, but the exemplary embodiments of the present disclosure may be equally applied to various wireless communication systems to which the relay system can be applied.

FIG. 1 is a conceptual diagram of a vehicle wireless communication system using a millimeter wave band.

Referring to FIG. 1, in a vehicle wireless communication system, vehicle-to-vehicle (V2V) communication, vehicle-to-pedestrian (V2P) communication, and vehicle-to-infrastructure entity (V2I) communication may be performed. The V2V communication may refer to communication between vehicles, the V2P communication may refer to communication between a vehicle and a device held by a pedestrian, and the V2I communication may refer to communication between a vehicle and an infrastructure (e.g., road side unit (RSU)) installed on a road.

Meanwhile, in the vehicle communication environment, movement of a vehicle terminal may frequently change due to a lane change of the vehicle or driving on a curved road. In addition, in case of a vehicle wireless communication system that uses a millimeter wave band, signal disconnection due to an unexpected line-of-sight (LOS) signal blocking according to the vehicle movement and surrounding objects (e.g., surrounding vehicles or surrounding structures) may occur. In order to solve such the problem, the relay is considered very important in the vehicle wireless communication system based on the millimeter wave band.

The relay may extend a network coverage, and improve a throughput of the network by relaying signals to a terminal at a network boundary or to a terminal outside the network. In addition, the relay may eliminate shadow areas in the network. In addition, the relay may effectively restore a communication link by relaying a signal when the millimeter wave signal is blocked due to an obstacle frequently occurring in the vehicle communication system.

In the existing mobile communication system, a relay has mainly considered a time division duplex (TDD) scheme in which a transmission period is separated from a reception period in time to avoid self-interference (SI). The SI refers to interference that occurs when a signal transmitted from an in-band full-duplex (IFD) transceiver is introduced into itself. The existing communication system adopts a half-duplex (HD) scheme that is less efficient in frequency than the IFD scheme, but is easy to control interference. Therefore, the relay based on the TDD scheme cannot transmit and receive signals simultaneously. For example, in case of an LTE-based relay, during a period in which the relay receives a signal from a backhaul link, the relay cannot transmit any signal including a control signal through a communication link between terminals. Therefore, the relay receives a signal from a base station only in a Multimedia Broadcast Single Frequency Network (MBSFN) subframe period in which a transmission gap exists, and transmits a PDCCH to the terminal in a specific OFDM symbol period. Accordingly, in the relay operating in the HD scheme, a time delay from the base station to the final terminal through the relay is very large, and timing alignment for temporally separating the transmission and reception periods to prevent the transmission/reception signals from interfering with each other should be controlled elaborately. In addition, there is a disadvantage that only limited data can be relayed, since it is not possible to allocate many time slots for the relay while separating the transmission and reception periods in time.

Figure 2:
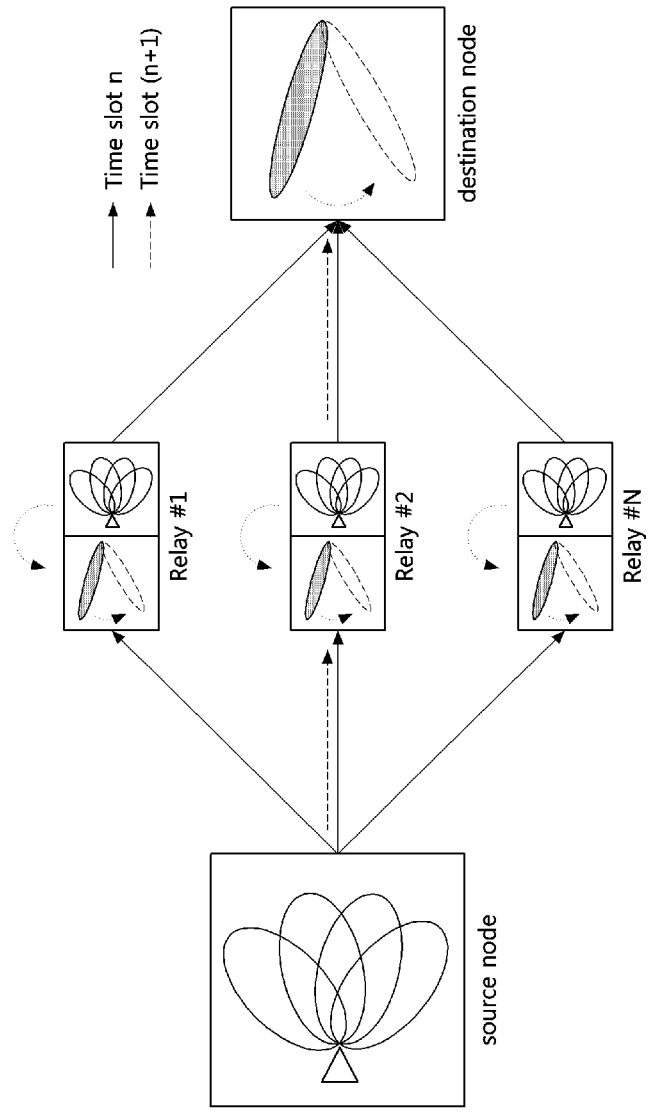
FIG. 2 is a conceptual diagram illustrating an operation of a multi-beam based full-duplex relay to which exemplary embodiments of the present disclosure are applied.

FIG. 2 is a conceptual diagram illustrating an operation of a multi-beam based full-duplex relay to which exemplary embodiments of the present disclosure are applied.

Referring to FIG. 2, in an exemplary embodiment of the present disclosure, each relay may operate in the IFD scheme. In addition, a source node, relay, and destination node may sequentially transmit a plurality of beams according to a predetermined pattern using a beam sweeping scheme, respectively. In this case, a relay discovery may be performed through the IFD scheme in which each relay (e.g., relays #1 to #N) receives a signal transmitted from the source node in an n-th time slot and transmits a signal to the destination node at the same time, and data may be transmitted in a (n+1)-th time slot through a selected relay. In addition, the IFD type relay may simultaneously perform relay discovery and data transmission in the n-th time slot by configuring a signal such as a training symbol. Exemplary embodiments according to the present disclosure may be applied to both the former case and the latter case.

The IFD type relays shown in FIG. 2 have a problem in that SI occurs when a signal transmitted from an IFD transceiver is introduced into itself. Exemplary embodiments of the present disclosure propose a multiple beam management method for controlling the SI of the IFD relay described above. A communication system using a millimeter wave frequency band has advantages in integrating a plurality of antennas in a transceiver, improving link performance through transmission and reception beam matching, and controlling interference through beam avoidance.

Referring to FIG. 2, a signal transmitted from the source node to the relays in the n-th time slot is denoted as $x_S$, and a signal transmitted by the i-th relay and a signal received at the i-th relay are denoted as $x_{R_i}$ and $y_{R_i}$, respectively. Also, a link formed between the source node and the i-th relay is denoted as $SR_i$. In this case, the received signal $y_{R_i}$ of the i-th relay may be expressed as Equation 1.

$$y_{R_i} = \sqrt{P_{S_i}} h_{SR_i} x_S + \sqrt{P_{R_i}} h_{L_i} x_{R_i} + n_i \quad \text{[Equation 1]}$$

In Equation 1, $P_{S_i}$ and $h_{SR_i}$ correspond to a transmission power of the source node and a channel component between the source and the i-th relay, respectively. In Equation 1, the second term is an SI component received from the i-th relay, and may be expressed as a transmission power $P_{R_i}$ and a channel component $h_{L_i}$ of the i-th relay. In this case, when multiple beams are applied to the transmission/reception signals, the channel components $h_{SR_i}$ and $h_{L_i}$ in Equation 1 may be expressed as channel components $\phi_{SR_i}$ and $\phi_{L_i}$ to which a beamforming gain and angle are applied, as shown in Equation 2 below.

$$\phi_{SR_i} = \sqrt{N_{St} N_{Rr}} \alpha_{Rr}{}^i(\theta_{Rr}{}^i) \alpha_{St}{}^i(\theta_{St}{}^i)_{SR_i}$$

$$\phi_{L_i} = \sqrt{N_{Rt} N_{Rr}} \alpha_{Rr}{}^i(\theta_{Rr}{}^i) \alpha_{Rt}{}^i(\theta_{Rt}{}^i)_{L_i} \quad \text{[Equation 2]}$$

Meanwhile, a signal received at the destination node through the IFD relay in the n-th time slot of FIG. 2 may be expressed as Equation 3 below.

$$y_{D_i} = \sqrt{P_{R_i}} h_{R_i D} x_{R_i} + \sqrt{P_{S_i}} h_{SD} x_S + n_D \quad \text{[Equation 3]}$$

In Equation 3, $h_{R_i D}$ and $h_{SD}$ correspond to a channel component between the i-th relay and the destination node and a channel component between the source node and the destination node, respectively. In this case, channel components $\phi_{R_i D}$ and $\phi_{SD}$ of a reception signal at the destination node, to which the multiple beams are applied, may be expressed as Equation 4 below.

$$\phi_{R_i D} = \sqrt{N_{Rt} N_{Dr}} \alpha_{Rt}{}^i(\theta_{Rt}{}^i) \alpha_{Dr}(\theta_{Dr})_{R_i D}$$

$$\phi_{SD} = \sqrt{N_{St} N_{Dr}} \alpha_{St}{}^i(\theta_{St}{}^i) \alpha_{Dr}(\theta_{Dr})_{SD} \quad \text{[Equation 4]}$$

As described above, in the IFD type relay, it can be seen that the size of SI varies according to a beam used between the source node and the relay node and a beam used between the relay and the destination node. Accordingly, hereinafter, methods for selecting transmission and reception beams at the source node, the relay, and the destination node, which can minimize the size of SI to increase the reception performance of the signal $y_{R_i}$ received from the source node to the relay and the signal $y_{D_i}$ received from the relay to the destination node in the IFD type relay, and a structure of the IFD type relay therefor will be described.

Figure 3:
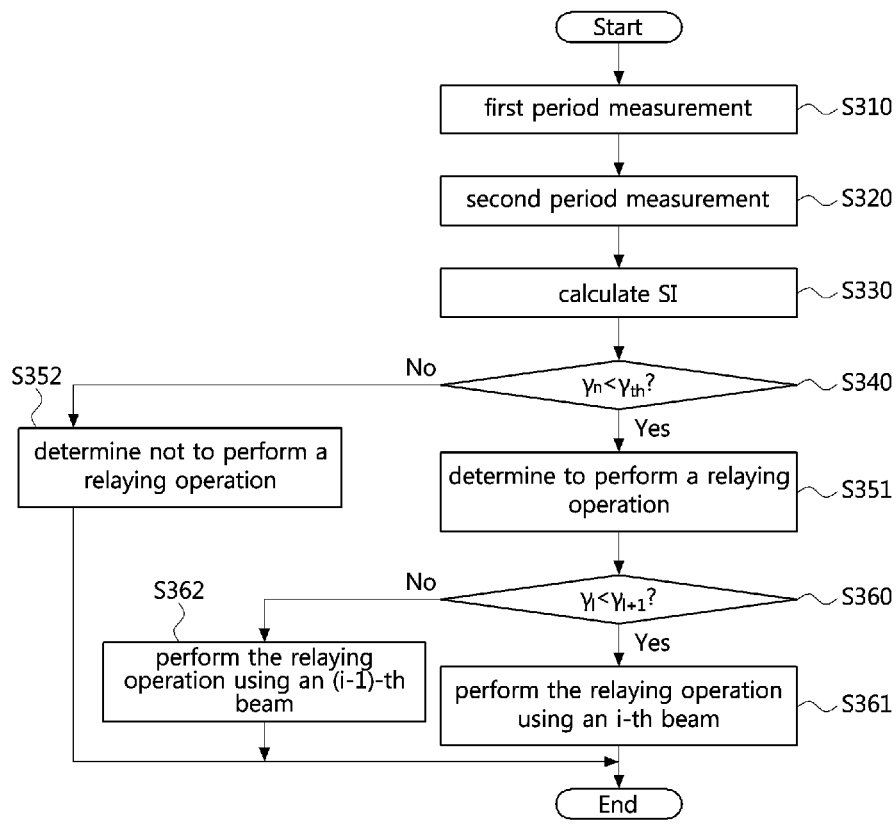
FIG. 3 is a flowchart for describing an operation method of an IFD relay according to an exemplary embodiment of the present disclosure.

FIG. 3 is a flowchart for describing an operation method of an IFD relay according to an exemplary embodiment of the present disclosure.

Referring to FIG. 3, when a link is established between a source node and a relay through beamforming, an IFD type relay (hereinafter, referred to simply as a relay) according to an exemplary embodiment of the present disclosure may measure a signal received from the source node during a first period (S310). In addition, during a second period after a predetermined delay time from the first period, the relay may measure a signal received from the source node and a signal received after being transmitted from the relay through a first beam (S320). In this case, the first period is a period in which the signal received from the source node exists, and the second period is a period in which the signal received from the source node and the signal introduced to the receiver of the relay after being transmitted from the transmitter of the relay through the first beam exist together. Meanwhile, a predetermined delay time may exist between the first period of the step S310 and the second period of the step S320.

Figure 4:
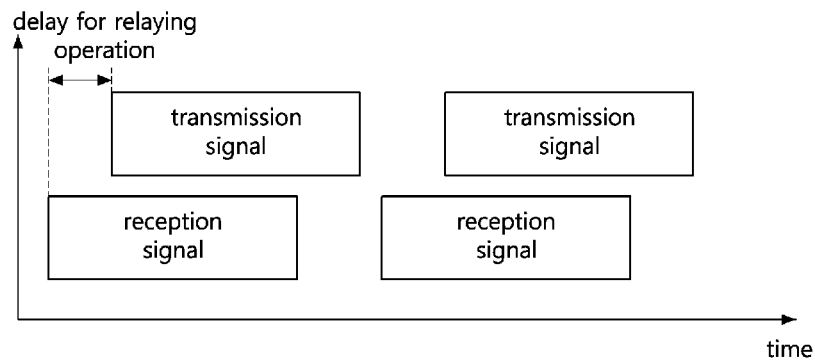
FIG. 4 is a conceptual diagram illustrating an example of configuring a measurement period for measuring self-interference in an IFD relay according to an exemplary embodiment of the present disclosure.
Figure 5:
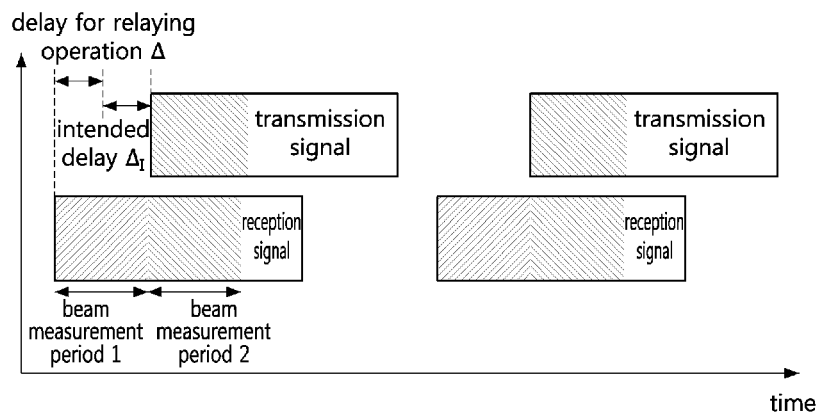
FIG. 5 is a diagram illustrating another example of configuring a measurement period for measuring self-interference in an IFD relay according to an exemplary embodiment of the present disclosure.

FIG. 4 is a conceptual diagram illustrating an example of configuring a measurement period for measuring self-interference in an IFD relay according to an exemplary embodiment of the present disclosure, and FIG. 5 is a diagram illustrating another example of configuring a measurement period for measuring self-interference in an IFD relay according to an exemplary embodiment of the present disclosure.

Referring to FIG. 4, in case of a general relay, a predetermined delay may occur in order to process a signal received from a source node and transmit the processed signal to a destination node. Specifically, in case of a relay operating in an amplify-and-forward (AF) scheme, such the predetermined delay time may be a time required for radio frequency (RF) processing, or the like. Alternatively, in case of a relay operating in a decode-and-forward (DF) scheme, such the predetermined delay time may be a time required for demodulation and modulation, or the like. Accordingly, the predetermined delay time between the first period of the step S310 and the second period of the step S320 may be a delay time for the relaying operation as described above. That is, the predetermined delay time refers to a time delay essentially required by characteristics of RF elements included in the relay device, or demodulation and re-modulation processing, regardless of the AF scheme or the DF scheme, and it may be a value already known to the relay device, a predefined value, or a preconfigured value.

Referring to FIG. 5, an intended delay $\Delta_I$ may exist between the first period and the second period in addition to the delay $\Delta$ due to the relaying operation described above with reference to FIG. 4. That is, in an exemplary embodiment of the present disclosure, the first period and the second period may be configured by using the time delay $\Delta$ known in advance by the relay and the intentional time delay $\Delta_I$.

As an example of signal measurement performed in the first period and the second period, an increase or decrease in a reception power between the first period and the second period may be measured. The first period is a period before the relay starts transmission of signals, and a reception power value measured in the first period may be denoted as $P_{S_i}$ in Equation 1. On the other hand, the second period is a period in which the relay transmits signals, and a reception power value measured in the second period may be denoted as $P_{y_{R_i}}$ in Equation 1. The reception signal powers measured in the first and second periods may vary according to a transmission beam (i.e., the direction of the transmission beam) of the source node, a reception beam (i.e., the direction of the reception beam) of the relay, and a transmission beam (i.e., the direction of the transmission beam) of the relay. In this case, in order to measure the reception powers, automatic gain control (AGC) values of the relay configured in the first period and the second period may be the same.

Meanwhile, the signals measured in the first and second periods may be a broadcast transmission signal such as a synchronization signal/physical broadcast channel (SS/PBCH) block of the 5G NR system. Alternatively, the signals measured in the first and second periods may be a physical sidelink broadcast channel (PSBCH) transmitted in front of a physical sidelink control channel (PSCCH) or a physical sidelink control channel (PSSCH) in a sidelink channel of the 5G NR V2X system. Alternatively, the signals measured in the first and second periods may be a preamble in front of a transmission payload, such as a short training format (STF) or a long training format (LTF) of the IEEE802.11 (i.e., WiFi).

Referring back to FIG. 3, the relay may calculate the amount of SI in the first beam based on the measurement result during the first period and the measurement result during the second period. That is, the relay may calculate a self-interference amount $\gamma_n$ of the first beam by comparing the measurement result during the second period and the measurement result during the first period (S330).

Then, the relay may compare a configured threshold $\gamma_{th}$ for SI management with the calculated SI amount $\gamma_n$ (S340), and when the calculated SI amount $\gamma_n$ is less than the configured threshold $\gamma_{th}$ (or equal to or less than the configured threshold $\gamma_{th}$), the relay may determine to perform a relaying operation for the source node (S351). On the other hand, when the calculated SI $\gamma_n$ is greater than the configured threshold value $\gamma_{th}$ (or is equal to or greater than the configured threshold value $\gamma_{th}$), the relay may determine not to perform a relaying operation for the source node (S352).

Meanwhile, when there are N transmission beams in the relay, L transmission beams having an amount of SI less than (or, equal to or less than) the configured threshold $\gamma_{th}$ among the N transmission beams may exist. In this case, the relay may compare the amount of SI $\gamma_{L-1}$ of the previous beam and the amount of SI $\gamma_L$ of the current beam (S360), select a transmission beam having a smaller amount of SI, and use the selected beam to perform a relaying operation for the source node (S361). Meanwhile, as another exemplary embodiment, the relay may select a transmission beam having the smallest amount of SI from among the N transmission beams according to a processing speed, memory, etc. of the relay, and perform a relaying operation on the source node using the selected beam.

Figure 6:
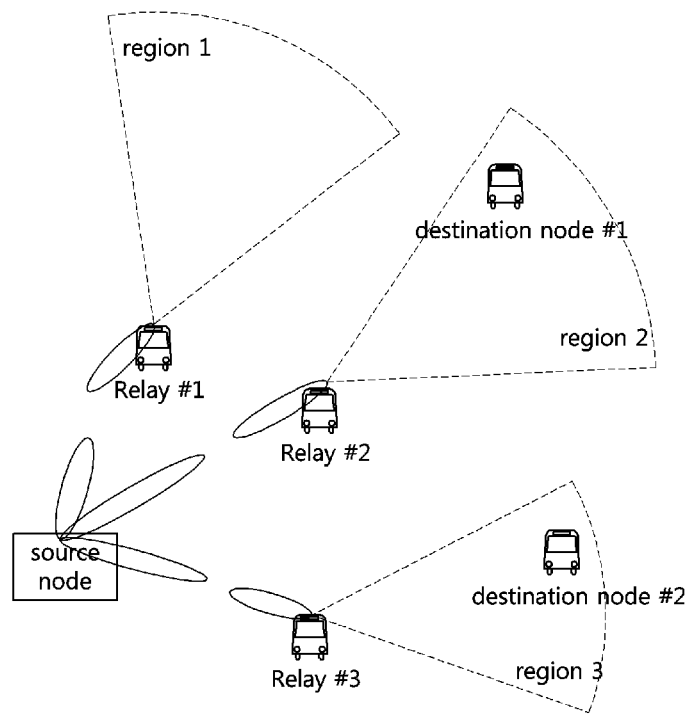
FIG. 6 is a conceptual diagram illustrating an operation region of each relay according to an operation method of an IFD type relay according to an exemplary embodiment of the present disclosure.

FIG. 6 is a conceptual diagram illustrating an operation region of each relay according to an operation method of an IFD type relay according to an exemplary embodiment of the present disclosure.

As described above, in the IFD relay according to the exemplary embodiment of the present disclosure, a region covered by a transmission beam is limited according to the threshold $\gamma_{th}$ configured for SI management. For example, referring to FIG. 6, a relay #1 may transmit a signal to a destination node of a region 1, but if there is no destination node in the region, the relay #1 may not be selected as a relay. Relays #2 and #3 may respectively configure regions 2 and 3 as relayable regions, and select a beam having the lowest SI among L transmission beams covering the region among N transmission beams.

Figure 7:
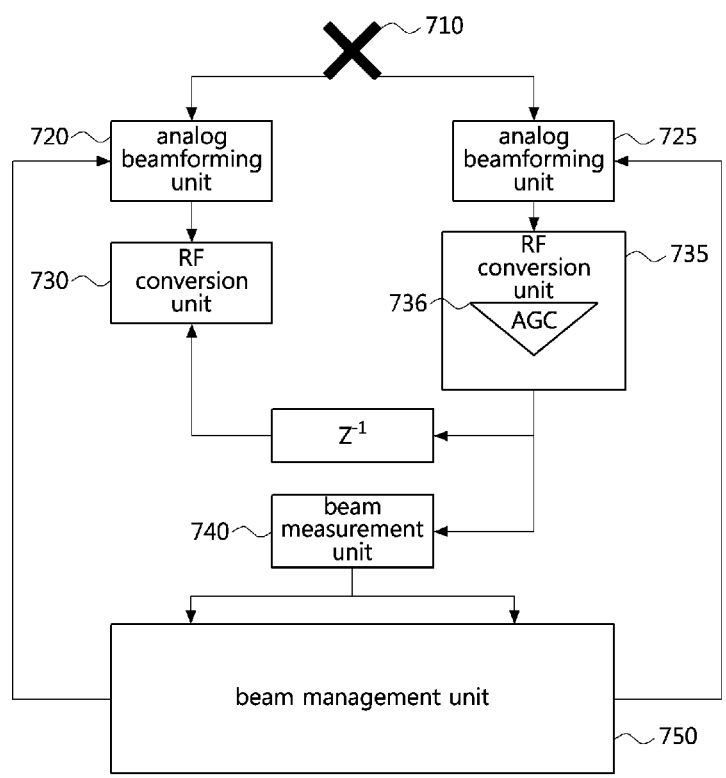
FIG. 7 is a block diagram illustrating a structure of an IFD type relay according to an exemplary embodiment of the present disclosure.

FIG. 7 is a block diagram illustrating a structure of an IFD type relay according to an exemplary embodiment of the present disclosure.

Referring to FIG. 7, the IFD relay according to the exemplary embodiment of the present disclosure may include an antenna unit 710, analog beamforming units 720 and 725, RF conversion units 730 and 735, a beam measurement unit 740, and a beam management unit 750. Here, the analog beamforming units 720 and 725 and the RF conversion units 730 and 735 are shown as being divided into a transmitting side and a receiving side, respectively.

The antenna unit 710 may be configured with a plurality of antennas or polarized antennas, and may be configured with a plurality of transmission antennas and reception antennas separated or configured with circulators, or the like connected to the respective antennas.

The analog beamforming units 720 and 725 for controlling SI occurring in the IFD relay may be connected to the transmission antenna and the reception antenna, respectively. Each beamforming unit may be composed of elements (e.g., phase shifter) for adjusting a gain and a phase.

The RF conversion units 730 and 735 may be largely composed of a frequency converter and a signal amplifier, and in detail, may include a local oscillator (LO) and an up/down converter performing a role of converting a baseband signal to be transmitted into an RF band signal or converting a received RF band signal into a baseband signal, and a high power amplifier (HPA), low noise amplifier (LNA), or variable gain amplifier (VGA) for amplifying an output size of an input signal, and/or the like. In particular, the VGA may be a component for automatic gain control (AGC) 736. The AGC 736 performs a function of adjusting the size (gain) of the received signal including SI in order to measure a signal-to-interference ratio (SIR) level of the signal received through beam control. As described above, the AGC values in the first period of the step S310 and the second period of the step S320 may be set to be the same.

The beam measurement unit 740 may perform a function of measuring the amount of SI or the SIR according to beamforming of the reception signal and the transmission signal. The beam measurement unit 740 may be configured in the RF conversion unit 731 and a digital modem unit. However, the beam measurement unit 740 may be configured in a time or frequency domain of the digital modem unit according to a measurement scheme.

The beam management unit 750 may perform a beam selection function to reduce interference signals including the SI received by the IFD relay, and may be included in the digital modem unit or separately depending on the implementation complexity, speed, or selection scheme of hardware, or implemented as a separate device.

The IFD relay operation method according to the exemplary embodiment of the present disclosure described with reference to FIG. 3 may be performed by the beam management unit 750 the controls the analog beamforming units 720 and 725, the RF conversion units 730 and 735, the beam measurement unit 740. To this end, the beam management unit 750 may include at least one processor and a memory including at least one instruction executed by the at least one processor.

That is, the beam management unit 750 may be configured to measure the signal received from the source node during the first period by using the beam measurement unit 740; measure the signal received from the source node and the signal received after being transmitted from the relay through a first beam during the second period after a predetermined delay time than the first period by using the analog beamforming units 720 and 725 and the beam measurement unit 740; and calculate the amount of SI of the first beam by comparing a measurement result during the second period and a measurement result during the first period.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a relay operating in an in-band full duplex (IFD) scheme, the operation method comprising:
    measuring a signal received from a source node during a first period;
    measuring a signal received from the source node and a signal received after being transmitted from the relay to a destination node through a first beam during a second period, the second period being a period after a predetermined delay time from the first period; and
    calculating a self-interference (SI) amount of the first beam by comparing a measurement result during the second period with a measurement result during the first period,
    wherein the predetermined delay time is a delay time for a relaying operation of the relay, or a time obtained by summing the delay time for the relaying operation of the relay and an additional intended delay time, and
    wherein automatic gain control (AGC) values of the relay in the first period and the second period are set to equal.

2. The operation method according to claim 1, wherein a signal measured in the first period and the second period is a synchronization signal, a short training format (STF) preamble, or a long training format (LTF) preamble.

3. The operation method according to claim 1, wherein the relay, the source node, and the destination node operate in a beam sweeping scheme.

4. The operation method according to claim 3, further comprising, when the calculated SI amount of the first beam is smaller than a predetermined or preconfigured threshold, determining to perform a relaying operation for the source node.

5. The operation method according to claim 4, wherein when the relay has N transmission beams, if SI amounts of L transmission beams among the N transmission beams are smaller than the predetermined or preconfigured threshold and an SI amount of an i-th beam of the L transmission beams is smaller than an SI amount of an (i−1)-th beam of the L transmission beams, the relay determines to perform the relaying operating for the source node by using the i-th transmission beam, N is a natural number, and L is a natural number equal to or less than N.

6. The operation method according to claim 4, wherein when the relay has N transmission beams, the relay determines to perform the relaying operating for the source node by using a transmission beam having a smallest SI amount among the N transmission beams, where N is a natural number.

7. A relay operating in an in-band full duplex (IFD) scheme, the relay comprising:
    an analog beamforming unit connected to at least one transmission antenna and at least one reception antenna;
    a radio frequency (RF) conversion unit for converting a baseband signal into an RF band signal or converting an RF band signal into a baseband signal, and controlling a gain of a reception signal;
    a beam measurement unit measuring a signal received from a source node and a signal received after being transmitted from the relay to a destination node through a first beam; and
    a beam management unit that controls operations of the analog beamforming unit, the RF conversion unit, and the beam measurement unit,
    wherein the beam management unit is configured to:
    measure a signal received from the source node during a first period;
    measure a signal received from the source node and a signal received after being transmitted from the relay to the destination node through the first beam during a second period, the second period being a period after a predetermined delay time from the first period; and
    calculate a self-interference (SI) amount of the first beam by comparing a measurement result during the second period with a measurement result during the first period,
    wherein the predetermined delay time is a delay time for a relaying operation of the relay, or a time obtained by summing the delay time for the relaying operation of the relay and an additional intended delay time, and
    wherein automatic gain control (AGC) values of the relay in the first period and the second period are set to equal.

8. The relay according to claim 7, wherein a signal measured in the first period and the second period is a synchronization signal, a short training format (STF) preamble, or a long training format (LTF) preamble.

9. The relay according to claim 7, wherein the relay, the source node, and the destination node operate in a beam sweeping scheme.

10. The relay according to claim 9, wherein when the calculated SI amount of the first beam is smaller than a predetermined or preconfigured threshold, the beam management unit determines to perform a relaying operation for the source node.

11. The relay according to claim 10, wherein when the analog beamforming unit forms N transmission beams, if SI amounts of L transmission beams among the N transmission beams are smaller than the predetermined or preconfigured threshold and an SI amount of an i-th beam of the L transmission beams is smaller than an SI amount of an (i−1)-th beam of the L transmission beams, the beam management unit determines to perform the relaying operating for the source node by using the i-th transmission beam, N is a natural number, and L is a natural number equal to or less than N.

12. The relay according to claim 10, wherein when the analog beamforming unit forms N transmission beams, the beam management unit determines to perform the relaying operating for the source node by using a transmission beam having a smallest SI amount among the N transmission beams, where N is a natural number.

* * * * *